(12) United States Patent
de Oliveira et al.

(10) Patent No.: US 8,726,378 B2
(45) Date of Patent: May 13, 2014

(54) ENFORCING INPUT VALIDATION THROUGH ASPECT ORIENTED PROGRAMMING

(75) Inventors: Anderson Santana de Oliveira, Antibes (FR); Theodoor Scholte, Antibes (FR); Gabriel Serme, Valbonne (FR)

(73) Assignee: SAP AG, Walldorf (DE)

( * ) Notice: Subject to any disclaimer, the term of this patent is extended or adjusted under 35 U.S.C. 154(b) by 246 days.

(21) Appl. No.: 13/282,931

(22) Filed: Oct. 27, 2011

(65) Prior Publication Data

US 2013/0111310 A1 May 2, 2013

(51) Int. Cl.
 *G06F 11/07* (2006.01)
(52) U.S. Cl.
 USPC ............. 726/22; 713/168; 713/189; 713/194; 715/741
(58) Field of Classification Search
 CPC ..... G06F 8/316; G06F 21/55; H04L 63/1416; H04L 63/083; H04L 63/1483
 USPC ........ 726/22, 21; 713/168, 189, 194; 715/741
 See application file for complete search history.

(56) References Cited

U.S. PATENT DOCUMENTS

| | | | |
|---|---|---|---|
| 8,356,346 B2 * | 1/2013 | Datta et al. | 726/15 |
| 8,356,946 B2 * | 1/2013 | Schaefer et al. | 384/589 |
| 2003/0037236 A1 | 2/2003 | Simon et al. | |
| 2004/0093599 A1 * | 5/2004 | Reynaud | 717/177 |
| 2007/0136809 A1 * | 6/2007 | Kim et al. | 726/22 |
| 2007/0234308 A1 * | 10/2007 | Feigenbaum et al. | 717/130 |
| 2008/0126869 A1 | 5/2008 | Kraft et al. | |
| 2008/0189549 A1 * | 8/2008 | Hughes | 713/171 |
| 2008/0222611 A1 * | 9/2008 | Sharma | 717/126 |
| 2009/0100518 A1 * | 4/2009 | Overcash | 726/22 |

FOREIGN PATENT DOCUMENTS

WO    WO2007009210 A1    1/2007

OTHER PUBLICATIONS

Davide Balzarotti et al., "Saner: Composing static and dynamic analysis to validate sanitization in web applications," In Proceedings of the 2008 IEEE Symposium on Security and Privacy, pp. 387-401, Washington, DC, USA, 2008. IEEE Computer Society.
E. Bernard et al., JSR 303: Bean validation, Bean Validation Expert Group, Mar. 2009, 124 pages.
The Apache Software Foundation, Struts 2, 2011, 122 pages.
William G. J. Halfond et al., "Using positive tainting and syntax-aware evaluation to counter SQL injection attacks," In Proceedings of the 14th ACM SIGSOFT international symposium on Foundations of software engineering, SIGSOFT'06/FSE-14, pp. 175-185, New York, NY, USA, Nov. 5-11, 2006, ACM.
J. Hookom, "Validating objects through metadata," Jan. 2005, retrieved from < http://onjava.com/lpt/a/5572 >, 6 pages.

(Continued)

*Primary Examiner* — Jason K. Gee
*Assistant Examiner* — Sharif E Ullah
(74) *Attorney, Agent, or Firm* — Fish & Richardson P.C.

(57) ABSTRACT

Implementations of the present disclosure include methods, systems, and computer readable storage mediums for validating input parameters provided to an application, including executing the application using the one or more processors, collecting one or more validation aspects associated with the application to provide a set of validation aspects, receiving a first input parameter that is associated with a first validation point, extracting a first data type of the first input parameter, and determining that a validation aspect corresponding to the first data type is available in the set of validation aspects and, in response, applying a corresponding validation function to the first input parameter.

11 Claims, 4 Drawing Sheets

(56) References Cited

OTHER PUBLICATIONS

Yao-Wen Huang et al., "Securing web application code by static analysis and runtime protection," In WWW '04: Proceedings of the 13th international conference on World Wide Web, pp. 40-52, New York, NY, USA, May 17-22, 2004, ACM.
Imperva, "Web Application Security," 2011, 4 pages.
Barracuda Networks Inc, "The barracuda web application firewall advantages," 2011, 4 pages.
O. Ismail et al., "A Proposal and Implementation of Automatic Detection/Collection System for Cross-Site Scripting Vulnerability," Proceedings of the 18$^{th}$ International Conference on Advanced Information Networking and Application (AINA'04), vol. 1, pp. 145-151, Mar. 2004.
JBoss, "Hibernate Validator," 2011, 47 pages.
Trevor Jim et al., "Defeating script injection attacks with browser-enforced embedded policies," In Proceedings of the 16th international conference on World Wide Web, WWW '07, pp. 601-610, New York, NY, USA, May 8-12, 2007. ACM.
Martin Johns et al., "SMask: preventing injection attacks in web applications by approximating automatic data/code separation," In Proceedings of the 2007 ACM symposium on Applied computing, SAC '07, pp. 284-291, Seoul, Korea, Mar. 11-15, 2007, ACM.
Martin Johns et al., "Secure code generation for web applications," In ESSoS 2010, vol. 5965 of Lecture Notes in Computer Science, pp. 96-113, 2010.
Nenad Jovanovic et al., "Pixy: A static analysis tool for detecting web application vulnerabilities (short paper)," In SP '06: Proceedings of the 2006 IEEE Symposium on Security and Privacy, pp. 258-263, Washington, DC, USA, 2006, IEEE Computer Society.
Nenad Jovanovic et al., "Precise alias analysis for static detection of web application vulnerabilities," In PLAS '06: Proceedings of the 2006 workshop on Programming languages and analysis for security, pp. 27-36, New York, NY, USA, 2006, ACM.
Gregor Kiczales et al., "Aspect-oriented programming," Published in proceedings of the European Conference on Object-Oriented Programming (ECOOP), vol. 1241 of Lecture Notes in Computer Science, pp. 220-242, Springer Berlin/Heidelberg, Jun. 1997.
Engin Kirda et al., "Noxes: a client-side solution for mitigating cross-site scripting attacks," In SAC'06, pp. 330-337, Apr. 23-27, 2006, Dijon, France, ACM.
V. Benjamin Livshits et al., "Finding security vulnerabilities in java applications with static analysis," In SSYM'05: Proceedings of the 14th conference on USENIX Security Symposium, 16 pages, Berkeley, CA, USA, 2005. USENIX Association.
Anh Nguyen-Tuong et al., "Automatically hardening web applications using precise tainting," In proceedings of the 20$^{th}$ IFIP International Information Security Conference, pp. 295-308, May 30-Jun. 1, 2005, Makuhari-Messe, Chiba, Japan.
Tadeusz Pietraszek et al., "Defending against injection attacks through context-sensitive string evaluation," In Proceedings of the 8th international conference on Recent Advances in Intrusion Detection (RAID'05), 2005, pp. 124-145.
William Robertson et al., "Static enforcement of web application integrity through strong typing," In Proceedings of the 18th conference on USENIX security symposium, SSYM'09, pp. 283-298, Berkeley, CA, USA, 2009, USENIX Association.
Theodoor Scholte et al., "Quo vadis? a study of the evolution of input validation vulnerabilities in web applications," In Proceedings of Financial Cryptography and Data Security 2011, Lecture Notes in Computer Science, Feb. 2011, 15 pages.
David Scott et al., "Abstracting application-level web security," In Proceedings of the 11th international conference on World Wide Web, WWW'02, pp. 396-407, New York, NY, USA, 2002, ACM.
Spring Source, Spring Framework: Spring web MVC, 2011, 840 pages.
Trustwave, Managed Web Application Firewall—Trustwave webdefend, 2011, 2 pages.
Philipp Vogt et al., "Cross-site scripting prevention with dynamic data tainting and static analysis," In Proceeding of the Network and Distributed System Security Symposium (NDSS'07), Feb. 2007, 12 pages.
Gary Wassermann et al., "Sound and precise analysis of web applications for injection vulnerabilities," In Proceedings of the 2007 ACM SIGPLAN conference on Programming language design and implementation, PLDI '07, pp. 32-41, San Diego, CA, USA, Jun. 11-13, 2007, ACM.
Gary Wassermann et al., "Static detection of cross-site scripting vulnerabilities," In ICSE '08: Proceedings of the 30th international conference on Software engineering, pp. 171-180, Leipzig, Germany, May 10-18, 2008, ACM.
Yichen Xie et al., "Static detection of security vulnerabilities in scripting languages," In Proceedings of the 15th conference on USENIX Security Symposium—vol. 15, Berkeley, CA, USA, 2006, USENIX Association.
Microsoft: Introduction to the Validation Application Block, retrieved from the Internet on Feb. 19, 2013 at http://msdn.microsoft.com/en-us/library/cc309320.aspx, 6 pages.
Wikipedia: "Aspect-oriented Programming," retrieved from internet on Apr. 3, 2013 at http://en.wikipedia.org/wiki/Aspect-oriented_programming, 12 pages.
European Search Report for European Patent Application No. 12007373.9, Feb. 21, 2013, 5 pages.
Serme et al., "Enforcing Input Validation through Aspect Oriented Programming," Computer Science, vol. 8247, Springer, 17 pages.

\* cited by examiner

ENFORCING INPUT VALIDATION THROUGH ASPECT ORIENTED PROGRAMMING

BACKGROUND

Web site owners and web site users have a vested interest in protecting the security of web applications and web services provided to various users. However, many web applications and web services are prone to input validation vulnerabilities, which may result from inadequate or incorrect sanitation of user-supplied inputs to the web applications and web services. Inadequate or incorrect validation and/or sanitization of these inputs can arise from invalid input assumptions made by a developer for a particular application. Injection attacks, also known as code injection attacks, exploit input validation vulnerabilities by injecting inputs including special characters and/or markers that alter the behavior of a targeted application in some undesirable manner. Injection attacks include SQL injections, cross-site scripting (XSS), command shell injection, and other types of injection attacks. Such attacks have become prevalent across web applications and can have devastating consequences to the targeted web application, including information leakage and privilege escalation, in which an attacker may gain full control of a system under attack.

SUMMARY

Implementations of the present disclosure include computer-implemented methods for validating input parameters provided to an application, the methods being performed using one or more processors and including the actions of executing the application using the one or more processors, collecting one or more validation aspects associated with the application to provide a set of validation aspects, receiving a first input parameter that is associated with a first validation point, extracting a first data type of the first input parameter, and determining that a validation aspect corresponding to the first data type is available in the set of validation aspects and, in response, applying a corresponding validation function to the first input parameter.

In some implementations, actions further include determining that the first input parameter is valid based on applying the validation function, and in response to determining the first input parameter is valid, processing the first input parameter through the application.

In some implementations, actions further include determining that the first input parameter is invalid based on applying the validation function, and in response to determining the first input parameter is invalid, prohibiting processing of the first input parameter through the application.

In some implementations, actions further include displaying an error message to a user that provided the first input parameter.

In some implementations, actions further include receiving a second input parameter that is associated with a second validation point, extracting a second data type of the second input parameter, and determining that a validation aspect corresponding to the second input parameter not available in the set of validation aspects and, in response, aborting execution of the application.

In some implementations, the first data type is an enhanced data type.

In some implementations, the application is a web application executed using one or more server computer devices.

In some implementations, the first input parameter is received from a client computing device.

In some implementations, actions further include identifying the one or more validation aspects based on annotations provided in source code of the application, each annotation corresponding to an input parameter and identifying a data type of the input parameter.

In some implementations, actions further include generating computer program code using aspect-oriented programming based on annotations provided in source code of the application, and executing the computer program code to intercept execution flow of the application and to perform extracting the first data type and determining that the validation aspect corresponding to the first data type is available in the set of validation aspects.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are generally directed to validating inputs to targeted web applications. In some examples, preventing input validation vulnerabilities relies heavily on developers; thus, including prevention techniques within the design and implementation phases of software development can help in making web applications and web services more secure. In particular, implementations of the present disclosure are directed to input validation through assignment of semantic meaning to unstructured and/or untrusted inputs to an application and ensuring that these inputs conform to a set of well-defined input constraints. In accordance with implementations of the present disclosure, this is achieved through separation of input validation code from application code. Via this process, the assignment of data types to input can be enforced while maintaining consistency between input validation and application logic. Furthermore, Aspect-Oriented Programming (AOP) can be non-invasively used in the automatic generation of input validation code without altering the business logic of the targeted application.

In accordance with AOP, an aspect can include a program feature that is linked to various parts of the program. In accordance with implementations of the present disclosure, an aspect can include an input to the program. In some implementations, an aspect can modify an input received by the program. In some implementations, an aspect can constrain an input to the program. In some examples, a pointcut can determine where or when an aspect should apply modifications to data affected by the program. A pointcut includes a set of join points, each join point being a point in the program where a piece of code associated with the pointcut (i.e., an advice) is executed. For example, a pointcut can determine where a point is located within the source code of an application or the events during which an application can be executed. In some implementations, pointcuts can further be expressed in pointcut languages. Pointcuts can include a large number of aspect-specific constructs that match specific structures of the language in which base applications are expressed, where the pattern language is based on language syntax.

Advices can be used to define modifications that may be performed by an aspect on a base application. In some implementations, advices may be expressed in terms of some general purpose language with a small number of aspect-specific extensions. For example, the proceed construct can allow execution of the behavior of the base application that triggered the aspect application initially.

Figure 1:
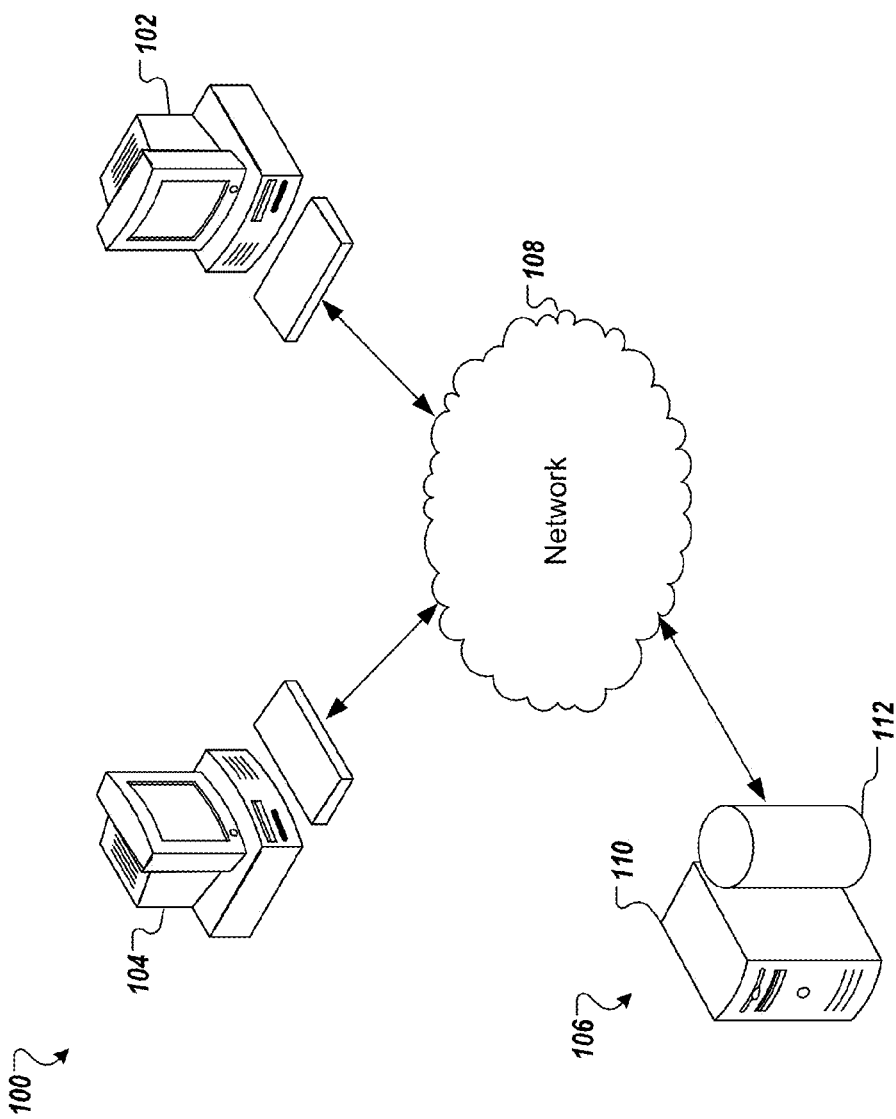
FIG. 1 depicts an example system that can be implemented in accordance with the present disclosure.

FIG. 1 depicts an example system that can be implemented in accordance with the present disclosure. The system 100 can include a legitimate client computing device 102 and a malicious client computing device 104. The client computing devices 102 and 104 can communicate with one or more of the computer systems 106 over a network 108. The computer system 106 can communicate with the client computing devices 102 and 104 over the network 108. The computer system 106 can include one or more servers 110 and one or more datastores 112. In some implementations, the system 100 may represent a client/server system supporting multiple computer systems 106 including one or more clients (e.g., client computing devices 102 and 104) that are connectively coupled for communication with one another over the network 108.

The client computing devices 102 and 104 can represent various forms of processing devices including, but not limited to, a desktop computer, a laptop computer, a handheld computer, a personal digital assistant (PDA), a cellular telephone, a network appliance, a camera, a smart phone, an enhanced general packet radio service (EGPRS) mobile phone, a media player, a navigation device, an email device, a game console, or a combination of any two or more of these data processing devices or other data processing devices. The client computing devices 102 and 104 may access application software on one or more of the computer systems 106.

The computer system 106 can represent various forms of server systems including, but not limited to a web server, an application server, a proxy server, a network server, or a server farm. For example, one or more of the servers 110 can be an application server that executes software accessed by the client computing devices 102 and 104. In some implementations, a user can invoke applications available on one or more of the servers 110 in a web browser running on a client (e.g., client computing device 102 and 104). Each application can individually access data from one or more repository resources (e.g., datastores 112).

In some implementations, the client computing device 102 may communicate wirelessly through a communication interface (not shown), which may include digital signal processing circuitry where necessary. The communication interface may provide for communications under various modes or protocols, such as Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. For example, the communication may occur through a radio-frequency transceiver (not shown). In addition, short-range communication may occur, such Bluetooth, WiFi, or other such transceiver communications.

The network 108 can be a large computer network, such as a local area network (LAN), wide area network (WAN), the Internet, a cellular network, or a combination thereof connecting any number of mobile clients, fixed clients, and/or servers. In some implementations, each client (e.g., client computing device 102) can communicate with one or more of the computer systems 106 via a virtual private network (VPN), Secure Shell (SSH) tunnel, or other secure network connection. In some implementations, the network 108 can include the Internet, a wireless service network and may include the Public Switched Telephone Network (PSTN). In other implementations, the network 108 may include a corporate network (e.g., an intranet) and one or more wireless access points.

The client computing devices 102 and 104 can establish their own sessions with the computer system 106. Each session can involve two-way information exchange between the computer system 106 and the client computing devices 102 and 104. For example, a Hypertext Transfer Protocol (HTTP) session can allow the association of information with individual users. A session can be a stateful session, in which at least one of the communicating parts (e.g., the computer systems 106 or the client computing device 102 or 104) stores information about the session history in order to be able to communicate. Alternatively, stateless communication during a stateless session includes independent requests with associated responses.

Each client computing device 102, 104 can provide input to a computer-executed application (e.g., a web application) executed on computer system 106. In the depicted example, a user of the client computing device 102 can be a legitimate user that provides non-malicious input to the application. The user of the client computing device 104 can be a malicious user that attempts to provide malicious input to the application. As discussed in further detail herein, implementations of the present disclosure enable the input to the application to be intercepted and validated before the application is able to process the input. In some examples, if the input is validated, the application receives the input. In some examples, if the input is not validated, an error is triggered and the application does not receive the input.

In accordance with the present disclosure, the source code underlying the application can be annotated. In particular, a developer can annotate the source code of the application. The annotations can each be associated with a point where input from an untrusted source is to be provided to the application. In some examples, annotations can provide a simple mechanism for non-invasively extending a programming language. Furthermore, annotations can designate input parameters and individually indicate their corresponding enhanced data types, discussed in further detail below. In some examples, a new executable or object code can be generated based on the annotated source code using AOP. The generated code can be executed to intercept the execution flow of the underlying program whenever an input is received. The input can be processed to determine whether the input conforms to a given pre-defined format. In some examples, an application reads a non-conforming input, and a programming exception can be raised.

In some implementations, all input parameters in the code are by default annotated by the developer before the application executes. In some examples, the developers can partially annotate the code or disregard the annotation phase completely. In some implementations, parameters that are not annotated are not validated, which can provide less secure code. However, in some instances, non-annotated parameters can allow for flexible protection. In some instances, an alternative way of providing enhanced data type information can be provided. For example, automatic provisioning from various data sources can be used to gather information about an acceptable input for a program. Example data sources can include a database data model, a configuration file separated from the code, other information in the framework, and scanning at runtime for the detection of the correct type.

Correct annotation of the input parameters within the application source code ensures correct verification of incoming data. In some examples, an incorrect validation mechanism can compromise the risk mitigation process. In order to correctly bind the parameters and variables of interest, the system can adopt a semi-automatic approach that combines user-based knowledge and automatic detection of data types (e.g., by using information gathered from model repositories, database schemas, etc.).

In some implementations, the developer uses the annotations to define the enhanced data types (also called Global Data Types) that are used across the application. In some examples, enhanced data types include business semantics and provide more precision regarding the expected user inputs. Therefore, enhanced data types differ from basic built-in data types of the programming language used in the source code. Example enhanced data types can include a product ID, an e-mail address, phone numbers, and addresses. In some examples, abstract types can be added to provide a fine-grained, stronger typing related to variables and parameters used in the application. For example, in a declaration string such as String email, the developer could add the annotation @Email String email, indicating that only strings obeying a certain pattern of email addresses will be accepted. Thus, both the set of enhanced data types and their corresponding validation functionalities can be extensive.

Figure 2:
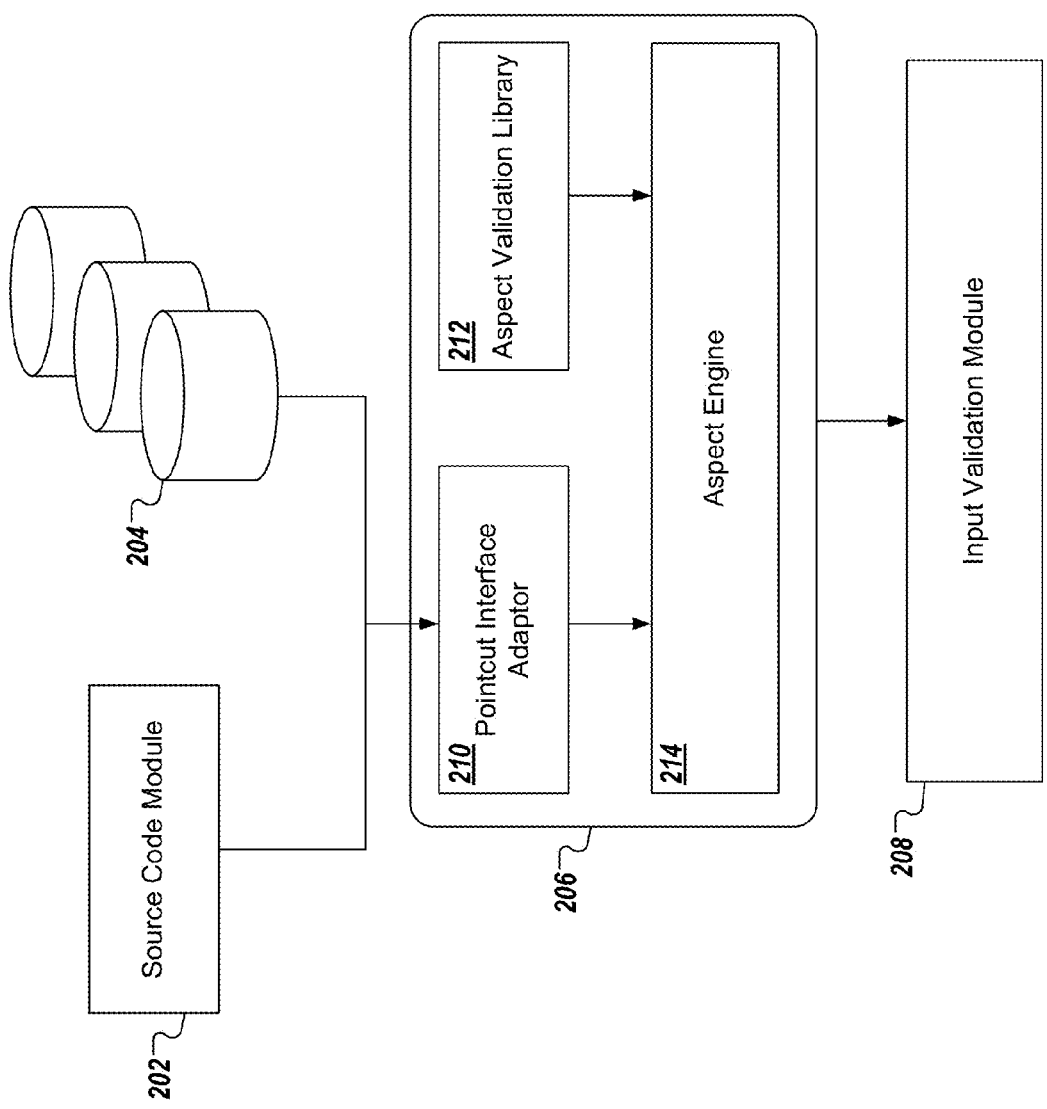
FIG. 2 depicts an example system architecture that can be implemented in accordance with the present disclosure.

Referring now to FIG. 2, an example system architecture 200 for validating input parameters to an application will be discussed. The architecture 200 includes a source code module 202, one or more data sources 204, an input validation sub-system 206, and an input validation module 208. The input validation sub-system 206 includes a pointcut interface adaptor 210, an aspect validation library module 212 and an aspect engine 214. Components of the system architecture 200 can be provided as one or more computer program applications that are executed using one or more processors, and/or can be provided as computer-readable memory.

The source code module 202 includes the annotated source code of a subject application and provides the annotated source code to the pointcut interface adaptor 210. The one or more data sources 204 can include, for example, an enterprise service repository (ESR), a Global Data Types repository, database schema repositories, web service description language (WSDL) repositories, and/or other repositories. The pointcut interface adaptor 210 processes the annotated source code and identifies points in the application where input parameters are used. The pointcut interface adaptor 210 maintains a mapping between enhanced data types and validation functions. In some examples, the pointcut interface adaptor 210 can extract data type information from one or more of the data sources 204 to add meta-data information needed for input validation. The data sources 204 can provide information on the type structure used in the application parameters, such that the enhanced data types associated with the application parameters can be inferred. Other information can also be found within the data sources 204 including, for example, lengths required for data fields or enumerated values, which may be useful for improving accuracy of the input data validation.

In some implementations, the aspect engine 214 can be provided as a traditional AOP aspect engine and can detect validation points during execution of the target application. In some examples, the aspect engine 214 can modify the data flow of the target application. For example, the aspect engine 214 can account for the types of annotations and insert data validation code wherever an assignment exists for an input parameter (i.e., a validation point). A validation point can refer to the validation of a specific parameter or variable from the target application. In some examples, a validation point can be inserted whenever data is read from an untrusted source or received from a final user.

In some implementations, upon detection of a validation point, the aspect engine 214 can extract the data type of a parameter and search for an existing validation library. In some examples, a validation library is retrieved from the aspect validation library module 212. If the aspect engine 214 finds such an appropriate validation library in the aspect validation library module 212, the aspect engine 214 can apply one or more validation mechanisms. In some examples, validation mechanisms can use regular expressions. In some instances, validation mechanisms can check a value range for an input parameter. In some cases, validation mechanisms can perform cross-checking with database values. The aspect validation library module 212 can provide one or more libraries including validation functions for each enhanced data type. In some examples, the aspect validation library module 212 can map the enhanced data types stored in an ESR to respective validation functions that are provided as aspects. In some implementations, validation functions can have a standardized interface in order to provide compatibility, and the mapping configuration in the pointcut interface adaptor 210 can be updated accordingly.

In some implementations, when a new specific data type is identified, an identifier name can be created for the data type. The name can be released among one or more application developers and stakeholders, such that the new available data type can be used to tag variables and parameters along the target application. In some examples, new names can have their corresponding validation aspects defined in the aspect validation library module 212 in parallel. In some examples, multiple validation aspects can be assigned to a single enhanced data type in the aspect validation library module

212. The validation behaviour is represented by a code advice. In some examples, the behaviour for validating an enhanced data type can be provided in regular expressions. In many programming languages, the handling of regular expressions can be provided as a built-in functionality. In some examples, more sophisticated attack vectors can require advanced pattern matching, and therefore, the valid input can be specified through XML-Schema validation, for example. This can enable a more expressive class of languages (i.e., context-free languages) to be accepted as input. Once the advice code for a specific enhanced data type is created, the validation code can be encapsulated in an aspect and compiled. The binaries generated from this process can then be deployed in the aspect validation library module 212.

In some implementations, aspects may be inserted into a target application at run-time. In some examples, it is assumed that several aspects are present within the aspect validation library module 212. In some examples, it is assumed that the application has accurate meta-information about the enhanced data types. Furthermore, the aspect engine 214 can be a specialized class loaded whose bootstraps target applications.

In some implementations, the input validation module 208 receives an input parameter provided by a user of the application. The input validation module 208 can determine a data type of the input parameter, can determine whether a validation function corresponding to the input parameter is available, and can apply the validation function to the input parameter to validate the input parameter. If the input parameter is invalid, the input validation module 208 can issue an error message and inhibits processing of the input parameter through the application. If the input parameter is valid, the input validation module 208 can pass the input parameter to the application for processing.

Figure 3:
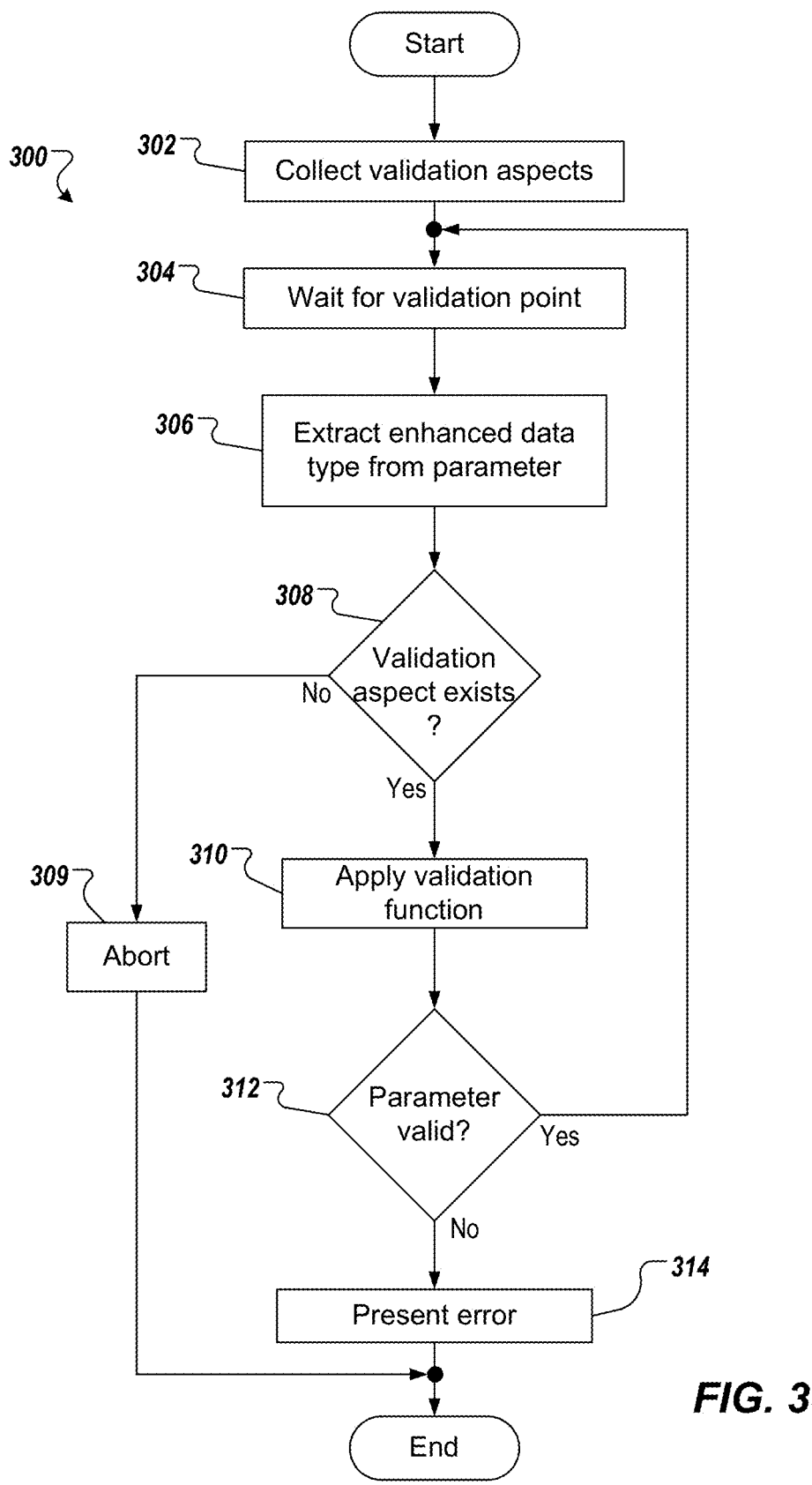
FIG. 3 is a flowchart depicting an example process that can be executed in accordance with implementations of the present disclosure.

FIG. 3 is a flowchart depicting an example process 300 that can be executed in accordance with implementations of the present disclosure. Validation aspects are collected (302). In some implementations, the aspect engine can search for available aspects in the aspect validation library. As the application code is loaded, the aspect engine can gather the points in the code that will need input validation and collect the applicable validation aspects at those points. During execution of the application, a validation point is waited for (304). In some examples, the aspect engine waits for a validation point to arise. When a validation point is encountered an enhanced data type is extracted from the input parameter associated with the validation point (306). It can be determined whether a validation aspect exists (i.e., whether an annotation is found for an input parameter in the case where the aspect engine is set to enforce validation for all) (308). If no valid aspect exists, execution of the application is aborted (309). In some examples, the application engine can also abort the application execution if no validation aspect is found for a particular annotation. In some instances, if no valid aspect exists, then the aspect engine can raise one or more error exceptions. If a valid aspect does exist, the aspect engine can apply the validation function to the input parameter (310). It is determined whether the input parameter is valid (312). If the input parameter is valid, the application is able to process the input parameter. If the input parameter is not valid, the application is not able to process the input parameters and an error message is displayed (314) (e.g., to the user who provided the input parameter). If there are no further validation points, the example process 300 ends.

Thus, implementations of the present disclosure include a number of advantages. In some examples, the non-invasive use of AOP can relieve developers from having to learn a new programming paradigm. In some examples, the program security can be increased with a high degree of automation with minimal effort. Furthermore, implementations of the present disclosure can relieve the developer from having to be familiar with program security. In some examples, the extensibility of the system can enable developers to create business-specific enhanced data types and corresponding validation aspects. New security functionality can further be integrated modularly without disrupting existing code. In some implementations, an administrator can disable the default requirement for annotation of all code. In some examples, implementations of the present disclosure can also be applied to an isolated application with a single user on a single client device, enabling the single user to benefit from the protections described herein.

Figure 4:
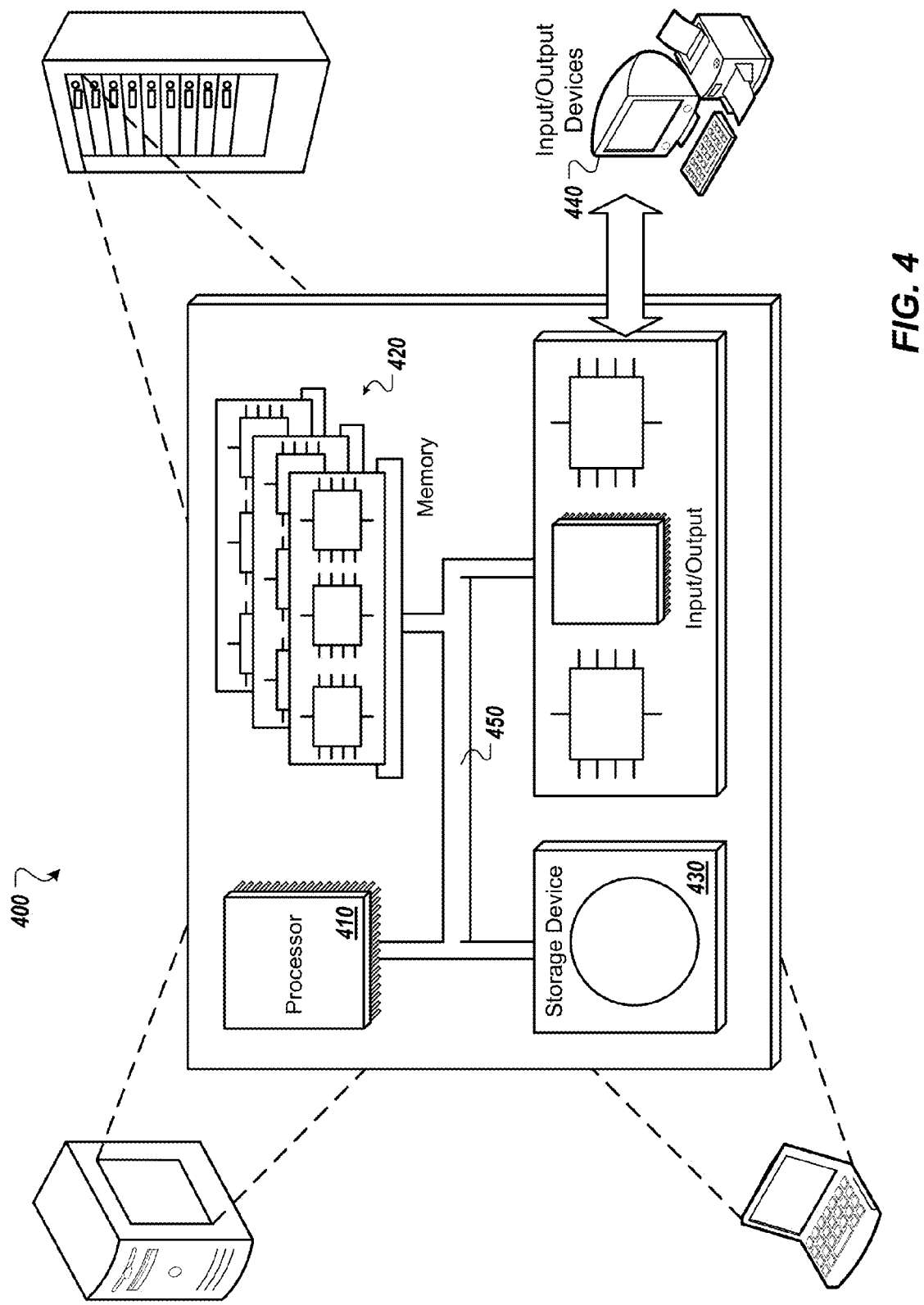
FIG. 4 is a schematic illustration of example computer systems that can be used to execute implementations of the present disclosure.

Referring now to FIG. 4, a schematic diagram of an example computing system 400 is provided. The system 400 can be used for the operations described in association with the implementations described herein. For example, the system 400 may be included in any or all of the server components discussed herein. The system 400 includes a processor 410, a memory 420, a storage device 430, and an input/output device 440. Each of the components 410, 420, 430, and 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit. The storage device 430 is capable of providing mass storage for the system 400. In one implementation, the storage device 430 is a computer-readable medium. In various different implementations, the storage device 430 may be a floppy disk device, a hard disk device, an optical disk device, or a tape device. The input/output device 440 provides input/output operations for the system 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for validating input parameters provided to an application, the computer-implemented method being performed using one or more processors and comprising:

generating computer program code using aspect-oriented programming based on annotations provided in source code of the application;

executing, by the one or more processors, the application, the application comprising one or more validation points that define points within the application where assignments exist for one or more input parameters, the one or more processors executing instructions to prevent the one or more input parameters from being received at the one or more validation points;

collecting, by the one or more processors, one or more validation aspects associated with the application to provide a set of validation aspects, at least one validation aspect comprising an input received by the application;

receiving, by the one or more processors, a first input parameter of the one or more input parameters that is associated with a first validation point of the one or more validation points; and executing the computer program code to intercept execution flow of the application and to perform:
   extracting, by the one or more processors, a first data type of the first input parameter; and
   determining, by the one or more processors, that a validation aspect corresponding to the first data type is available in the set of validation aspects and, in response, applying a corresponding validation function to the first input parameter.

2. The computer-implemented method of claim 1, further comprising:
   determining that the first input parameter is valid based on applying the validation function; and
   in response to determining the first input parameter is valid, processing the first input parameter through the application.

3. The computer-implemented method of claim 1, further comprising:
   determining that the first input parameter is invalid based on applying the validation function; and
   in response to determining the first input parameter is invalid, prohibiting processing of the first input parameter through the application.

4. The computer-implemented method of claim 3, further comprising displaying an error message to a user that provided the first input parameter.

5. The computer-implemented method of claim 1, further comprising:
   receiving a second input parameter that is associated with a second validation point;
   extracting a second data type of the second input parameter; and
   determining that a validation aspect corresponding to the second input parameter not available in the set of validation aspects and, in response, aborting execution of the application.

6. The computer-implemented method of claim 1, wherein the first data type is an enhanced data type.

7. The computer-implemented method of claim 1, wherein the application is a web application executed using one or more server computing devices.

8. The computer-implemented method of claim 7, wherein the first input parameter is received from a client computing device.

9. The computer-implemented method of claim 1, further comprising identifying the one or more validation aspects based on annotations provided in source code of the application, each annotation corresponding to an input parameter and identifying a data type of the input parameter.

10. A non-transitory computer-readable storage medium coupled to one or more processors and having instructions stored thereon which, when executed by the one or more processors, cause the one or more processors to perform operations for validating input parameters provided to an application, the operations comprising:
- generating computer program code using aspect-oriented programming based on annotations provided in source code of the application;
- executing the application using the one or more processors, the application comprising one or more validation points that define points within the application where assignments exist for one or more input parameters, the one or more processors executing instructions to prevent the one or more input parameters from being received at the one or more validation points;
- collecting one or more validation aspects associated with the application to provide a set of validation aspects, at least one validation aspect comprising an input received by the application;
- receiving a first input parameter of the one or more input parameters that is associated with a first validation point of the one or more validation points; and
- executing the computer program code to intercept execution flow of the application and to perform:
  - extracting a first data type of the first input parameter; and
  - determining that a validation aspect corresponding to the first data type is available in the set of validation aspects and, in response, applying a corresponding validation function to the first input parameter.

11. A system, comprising:
a computing device; and
a computer-readable storage device coupled to the computing device and having instructions stored thereon which, when executed by the computing device, cause the computing device to perform operations for validating input parameters provided to an application, the operations comprising:
- generating computer program code using aspect-oriented programming based on annotations provided in source code of the application;
- executing the application using the computing device, the application comprising one or more validation points that define points within the application where assignments exist for one or more input parameters, the computing device executing instructions executable to prevent the one or more input parameters from being received at the one or more validation points;
- collecting one or more validation aspects associated with the application to provide a set of validation aspects, at least one validation aspect comprising an input received by the application;
- receiving a first input parameter of the one or more input parameters that is associated with a first validation point of the one or more validation points; and
- executing the computer program code to intercept execution flow of the application and to perform:
  - extracting a first data type of the first input parameter; and
  - determining that a validation aspect corresponding to the first data type is available in the set of validation aspects and, in response, applying a corresponding validation function to the first input parameter.

* * * * *